United States Patent
Imai et al.

[11] Patent Number: 6,115,148
[45] Date of Patent: Sep. 5, 2000

[54] IMAGE PROCESSING APPARATUS

[75] Inventors: Kunio Imai, Hachioji; Masaya Kikuta, Tokyo; Hiroaki Kitazawa, Sagamihara; Yuichi Hirai, Kawasaki; Norio Shimura, Yokohama, all of Japan

[73] Assignee: Canon Kabushiki Kaisha, Tokyo, Japan

[21] Appl. No.: 08/993,054

[22] Filed: Dec. 18, 1997

[51] Int. Cl.⁷ .................................................. H04N 1/46
[52] U.S. Cl. ........................... 358/500; 358/518; 358/530
[58] Field of Search ................................... 358/500, 501, 358/530, 537, 538, 540, 1.9; 352/312

[56] References Cited

U.S. PATENT DOCUMENTS

| | | | |
|---|---|---|---|
| 5,166,782 | 11/1992 | Asaida | 358/41 |
| 5,245,444 | 9/1993 | Hashimoto | 358/445 |
| 5,467,422 | 11/1995 | Itihara et al. | 358/298 |
| 5,521,637 | 5/1996 | Asaida et al. | 348/222 |
| 5,576,848 | 11/1996 | Kusano | 358/449 |
| 5,627,660 | 5/1997 | Kusano et al. | 358/449 |

*Primary Examiner*—Jerome Grant, II
*Attorney, Agent, or Firm*—Fitzpatrick, Cella, Harper & Scinto

[57] ABSTRACT

An image processor includes a video processing circuit which converts and processes a video signal. A first image processing circuit further processes the video signal processed by the video processing circuit, with emphasis on image gradation to generate image data matching the recording format of a recording apparatus. A second image processing circuit further processes the video signal processed by the video processing circuit, with emphasis on the sharpness of image contours to generate image data matching the recording format of the recording apparatus. A selecting circuit selects the first or second image processing circuit based on the type of video signal processed by the video processing circuit.

12 Claims, 7 Drawing Sheets

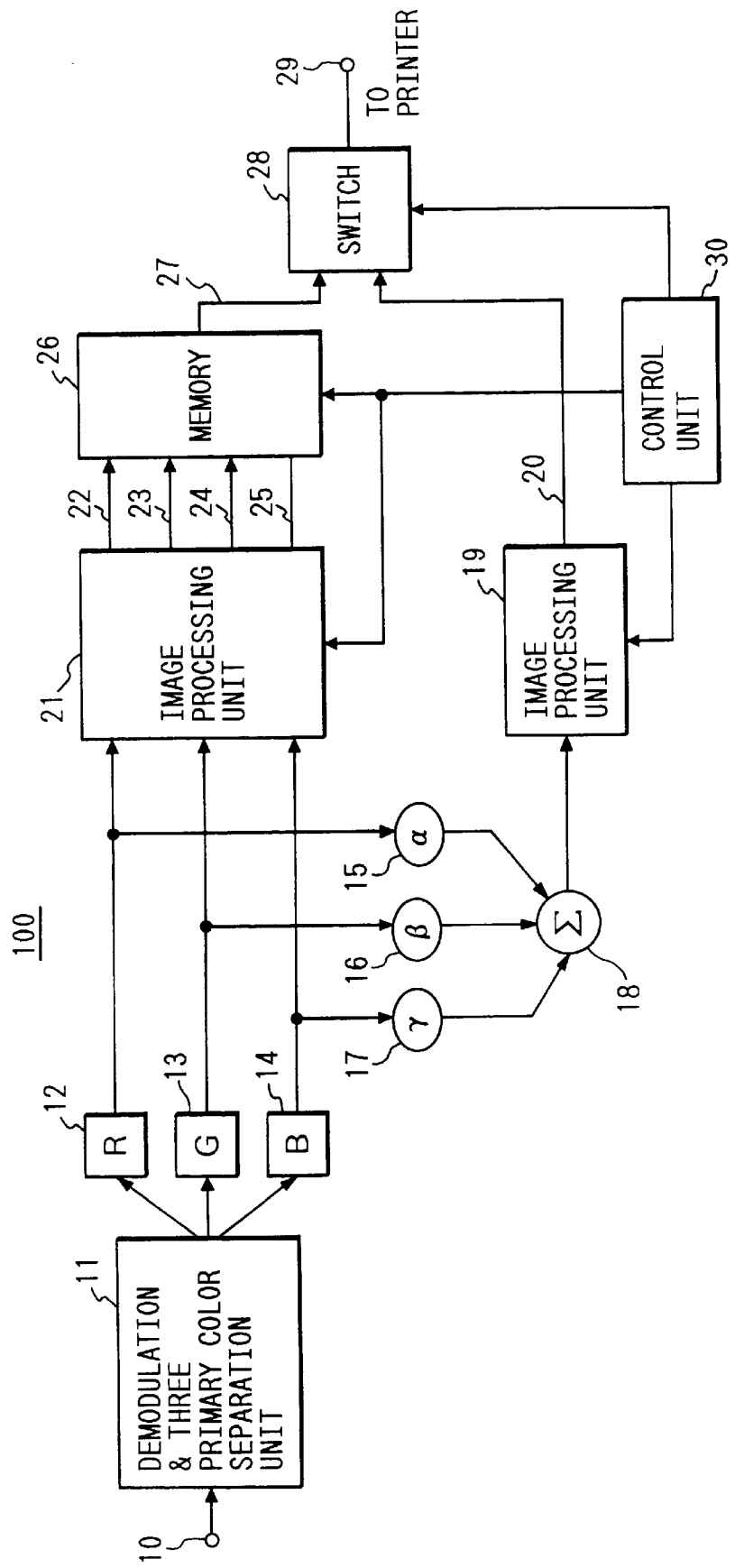

IMAGE PROCESSING APPARATUS

BACKGROUND OF THE INVENTION

1. Field of the Invention

The present invention relates to an image processing apparatus for processing a video signal to generate image data suitable for a recording apparatus such as a printer.

2. Related Background Art

FIG. 1 is a block diagram of an image processing apparatus employed as a capture board for image fetching in a conventional printer, wherein various circuit blocks are provided on a same circuit board.

Referring to FIG. 1, an input unit 12 receives an analog composite video signal from an image taking equipment such as a video camera or a VCR, for provision to a video signal processing unit 13 which demodulates the composite video signal to generate R, G and B signals. The R, G and B signals are converted by an A/D converter 14 into digital signals, which are temporarily stored in a RAM 15. A synchronization processing unit 16 separates synchronization signals from the video signals and provides the synchronization signals to the A/D converter 14, for synchronizing the sampling timing thereof.

A processing unit (microprocessing unit: MPU) 17 processes the R, G and B data of the RAM 15 according to a program stored in a ROM 18, thereby generating image data matching the recording format of a printer, and sends the data to the printer through an external interface 19. The MPU 17 also controls other circuits based on the program.

A switching controller 20, for switching the bus line in synchronization with the synchronization signals, for enabling the use of a common bus of the present apparatus for digital signals by various circuits, is composed, for example, of an ASIC (application specific integrated circuit such as a gate array. There are also shown a data bus 21 and an address bus 22.

In the image processing apparatus of the above-mentioned configuration, the R, G, B signals of the RAM 15 are converted by the MPU 17 into image data matching the recording format of the printer. For example, in case of process printing, the R, G and B signals are converted into data of complimentary colors, having gradation in cyan, magenta, yellow and black colors.

Also in case of ink jet recording, which can only perform a binary representation, there is executed a process providing a pseudo gradational representation, corresponding to the multi-value representation of the input video signals.

FIG. 2 is a perspective view of a recording unit of a printer of the ink jet recording system, wherein a recording sheet is advanced by a roller 24 and recording is-executed thereon by a recording head 25. The recording head 25 is provided with a plurality of nozzles along the sub scanning direction, and forms an image on the recording sheet 23 by selectively discharging ink from the nozzles according to the image information, while moving in the main scanning direction. A cap 26 is provided for preventing the ink from drying in the nozzles.

Also, an animation image may be entered from home-use computer game machines as the input signal source. In such case, the input image is developed once in a memory, but the amount of image information per frame of the cathode ray tube is significantly large and the capacity of the existing semiconductor memory is not large enough for this purpose. In inexpensive game machines, the effective image frame is made narrower to optimize the memory capacity.

The conventional image processing apparatus is designed to generate image data, for example of cyan, magenta, yellow and black colors, matching the recording format of the printer by processing the input video signals in the above-described manner, and always executes same image processing without any particular consideration of the content of the image. For this reason, the quality of the output image may be deteriorated for some image components.

More specifically, for a natural image, important factors are luminocity and color gradation, while, for an animation image, the sharpness of the image contour portions is important. Thus, an image processing advantageous for one image may be disadvantages for the other. For example, with image processing advantageous for an animation image, the natural image will lose gradation and will appear like a water-colored painting. On the other hand, with image processing advantageous for the natural image, the animation image will lose sharpness at the contour portions and will appear as an unsharp image.

Also in case the effective image frame is made narrower by utilizing a computer game machine as the input signal source, there results a black blank period in addition to the flyback period in the scanning operation. In case of display on a cathode ray tube, such blank portion at the corners is usually not conspicuous because of the structure of the cathode ray tube, but, in case of the capture board for the conventional printer, such blank portions are directly recorded on the recording medium, thus resulting in an unpleasant impression on the reproduced image.

SUMMARY OF THE INVENTION

In consideration of the foregoing, an object of the present invention is to provide an image processing apparatus capable of generating image data of an optimum quality matching the image content of the input video signal, for provision to a recording apparatus.

Another object of the present invention is to resolve the above-mentioned drawbacks.

The foregoing objects can be attained, according to a first embodiment of the present invention, by an image processing apparatus comprising plural image processing units for applying mutually different image processings to the video signal, thereby generating image data matching the recording format of the recording apparatus, and selection means for selecting one of the plural image processing units.

According to a second embodiment of the present invention, there are provided a video signal processing unit for converting a video signal into a format enabling image processing; a first image processing unit for applying, to the signal processed by the video signal processing unit, image processing with emphasis on the gradation of the image thereby generating image data matching the recording format of the recording apparatus; a second image processing unit for applying, to the signal processed by the video signal processing unit, image processing with emphasis on the sharpness of the image contours, thereby generating image data matching the recording format of the recording apparatus; and selection means for selecting either of the first and second image processing units.

According to a third embodiment of the present invention, there are provided plural image processing units for applying mutually different image processings to the video signal thereby generating image data matching the recording format of the recording apparatus; selection means for selecting one of the plural image processing units; a memory for storing the image data obtained from the image processing unit selected by the selection means; image size setting means for setting the size of the effective image frame in case of recording from the image data; and data replacing means for designating a read-out area in the memory, corresponding to the image frame size set by the image size setting means and replacing the image data, outside the read-out area, with predetermined data.

According to a fourth embodiment of the present invention, there are provided a video signal processing unit for converting the video signal into a format enabling image processing; a first image processing unit for applying, to the signal processed by the video signal processing unit, image processing with emphasis on the gradation of the image, thereby generating image data matching the recording format of the recording apparatus; a second image processing unit for applying, to the signal processed by the video signal processing unit, image processing with emphasis on the sharpness of the image contours, thereby generating the image data matching the recording format of the recording apparatus; selection means for selecting either of the first and second image processing units; a memory for storing the image data obtained from the first or second image processing unit selected by the selection means; image size setting means for setting the size of the effective image frame in case of recording of the image data; and data replacing means for designating a read-out area, in the memory, corresponding to the image frame size set by the image size setting means and replacing the image data, outside the read-out area, with predetermined data.

According to the above-mentioned first embodiment, the image quality is optimized by selecting one of the plural image processing units according to the image content of the input video signal.

According to the above-mentioned second embodiment, the image quality is optimized by causing the selection means to select the first image processing unit in case the image content is a natural image, and to select the second image processing unit in case the image content is an animation image.

According to the above-mentioned third embodiment, the image quality is optimized by selecting one of the plural image processing units by means of the selection means according to the image content of the input video signal, and in case the effective image frame size is set smaller than the ordinary image frame size, the blank portion outside the effective image frame is replaced by predetermined data.

According to the above-mentioned fourth embodiment, the image quality is optimized by causing the selection means to select the first image processing unit in case the image content is a natural image, and to select the second image processing unit in case the image content is an animation image, and, in case the effective image frame size is set smaller than the ordinary image frame, the blank portion outside the effective image frame is replaced by predetermined data.

Still another object of the present invention is to provide an image processing apparatus enabling image printing operation in a color printer, a monochromatic printer or a black-and-white printer even in case the input video signal is an output signal from a video equipment.

The above-mentioned object is attained by an image processing apparatus comprising a color separation unit for separating the input video signal into three primary color signals; a first image processing unit for applying signal processing matching a color printer and a monochromatic printer to the three primary color signals obtained from the color separation unit, thereby generating density information of plural color inks employed in the printers; a memory for storing the density information obtained from the first image processing unit, and reading different density information substantially simultaneously in the unit of each scanning line in case of color printing and reading the different density information in succession in the unit of each image frame in case of monochromatic printing; a second image processing unit for mixing the three primary color signals, obtained from the color separation unit, with a predetermined ratio and applying signal processing matching the black-and-white printing thereby generating luminance information; a selector for selecting each of the density information read from the memory or the luminance information obtained from the second image processing unit; and a control unit for controlling the first and second image processing unit, memory and selector.

According to the present embodiment, the input video signal is demodulated and separated into three primary color signals, which are subjected to signal processing according to one of the three modes of color printing, monochromatic printing and black-and-white printing, thereby generating density information for the plural color inks and luminance information, wherein the density information is stored in the memory. The above-mentioned density information and luminance information are supplied selectively to the printer, according to each of the above-mentioned modes.

Still other objects of the present invention, and features thereof, will become fully apparent from the following description to be taken in conjunction with the attached drawings.

BRIEF DESCRIPTION OF THE DRAWINGS

FIG. 8 is a block diagram showing the configuration of a print system employing the image processing apparatus of the present invention.

DETAILED DESCRIPTION OF THE PREFERRED EMBODIMENTS

Figure 1:
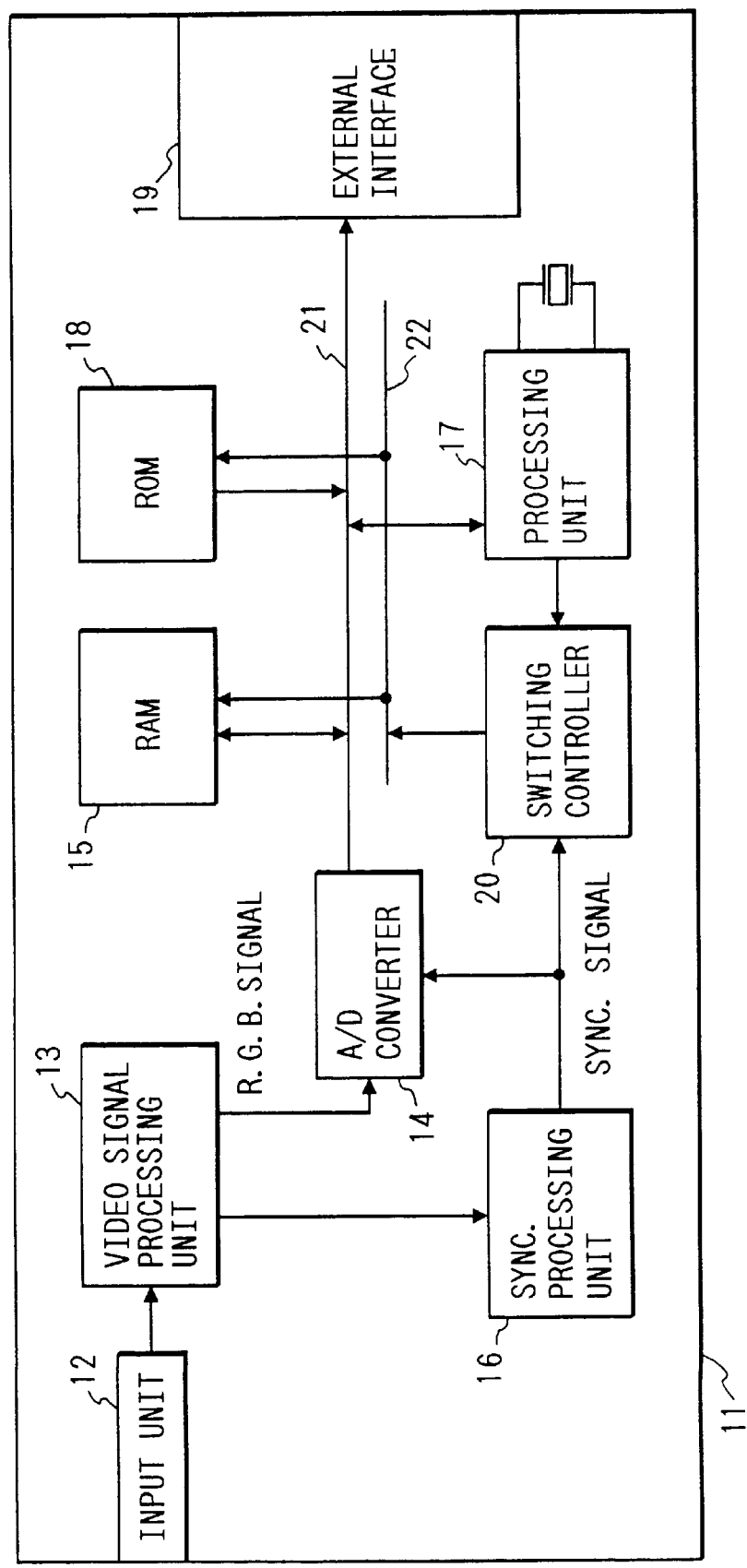
FIG. 1 is a block diagram of a conventional image processing apparatus.

The present invention is described below with reference to the preferred embodiments thereof, as; shown in the drawings.

Figure 3:
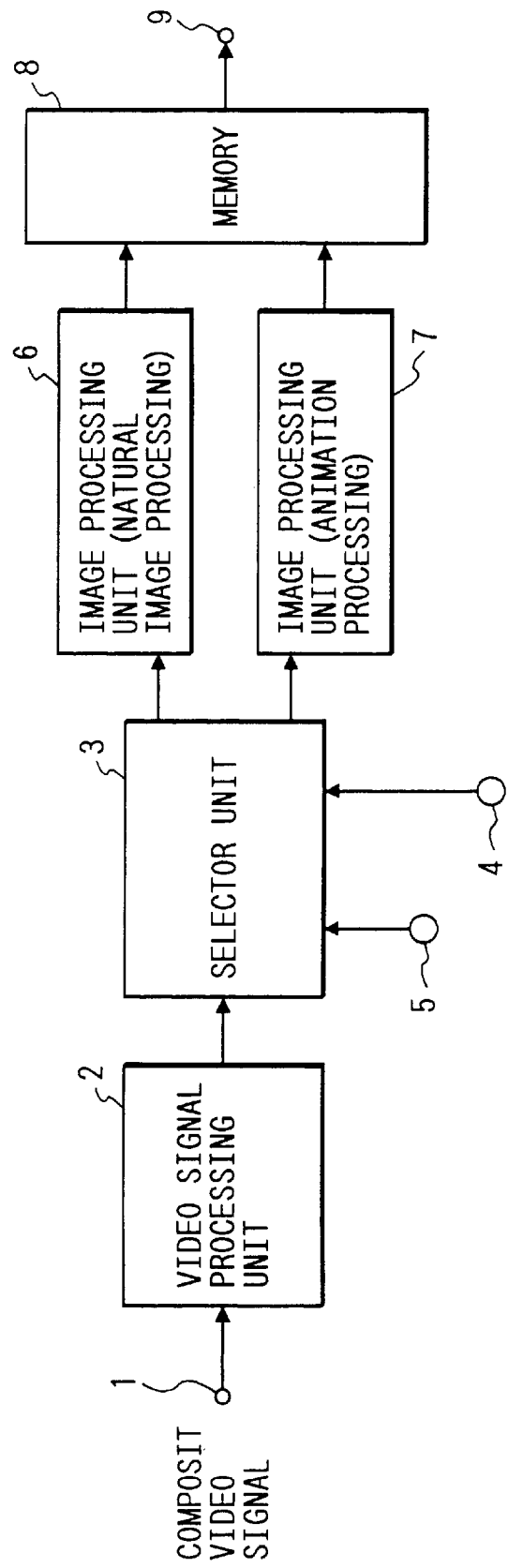
FIG. 3 is a block diagram of a first embodiment of the present invention.

FIG. 3 is a block diagram of a first embodiment of the present invention, wherein shown are, an input terminal 1 for the composite video signal; a video signal processing unit 2 for effecting, on the composite video signal, separation of the synchronization signals, separation of Y/C signals, generation of R, G, B signals and sampling and quantization of the R, G, B signals; a selector unit 3 for effecting selection according to the image content of the video signal; a switching apparatus 4 for controlling the switching operation of the selector unit 3; and a switch 5 for determining the timing of image fetching of the selector unit 3.

Image processing units 6, 7 effect different image processings according to the image content, thereby generating image data to be supplied to the printer. The first image processing unit 6 is so designed as to effect a process which emphasizes the image gradation, while the second image processing unit 7 is so designed as to effect a process emphasizing the sharpness of the image contours. There are also provided, a memory 8 for temporarily storing the image data obtained by the image processing; and an output terminal 9 for sending the image data, read from the memory 8, to a printer or a host computer connected thereto.

The function of the above-described configuration is described below, with reference to the flow chart shown in FIG. 4.

A user shifts the switching device 4 according to the image content to be entered. In the present embodiment the process is classified for a natural image and an animation image. For example, in case of entering an animation image (including a computer graphic image), the user selects the animation process mode by the switch device 4 (step S1), whereby the selector unit 3 selects and connects the image processing unit 7 (for an animation process). When the composite video signal is entered from a video taking equipment into the input terminal 1, the video signal processing unit 2 repeats the entry of, and process of the video signal until a desired image is entered (steps S2, S3).

When a desired image to be recorded is entered and selected by the switch 5 (step S4), the corresponding video signal is transferred by the selector unit 3 to the selected image processing unit 6 or 7. Suitable image processing is executed in the image processing unit 6 or 7, respectively, if the natural image process mode or the animation image process mode is selected in the step S1, whereby image data are developed (step S5). In the natural image process there is executed a process providing emphasis on image gradation (step S6), while, in the animation image process mode, there is executed a process providing emphasis on the image contours (step S7). The above-mentioned processes do not reject the entry of the mutually opposite image contents. For example the image processing unit 6 provides an output from an animation image, but, in such case, the quality of the recorded image does not exceed that obtained in the process of the conventional device.

The image data prepared in the image processing units 6, 7 are matched for the recording on the final recording medium, and, for example in case of recording on a recording sheet in a printer, are based on cyan, magenta, yellow and black colors. Also in case of printing with an ink jet printer with black ink, black data are generated by black extraction. In this operation, the image processing units 6, 7 effect binarization of the multi-value data. The image data generated in the process of the above-mentioned steps S5, S6 are stored in the memory 8 (step S8), and the data are released, through the output terminal 9, to the recording unit of the printer (step S9).

Figure 5:
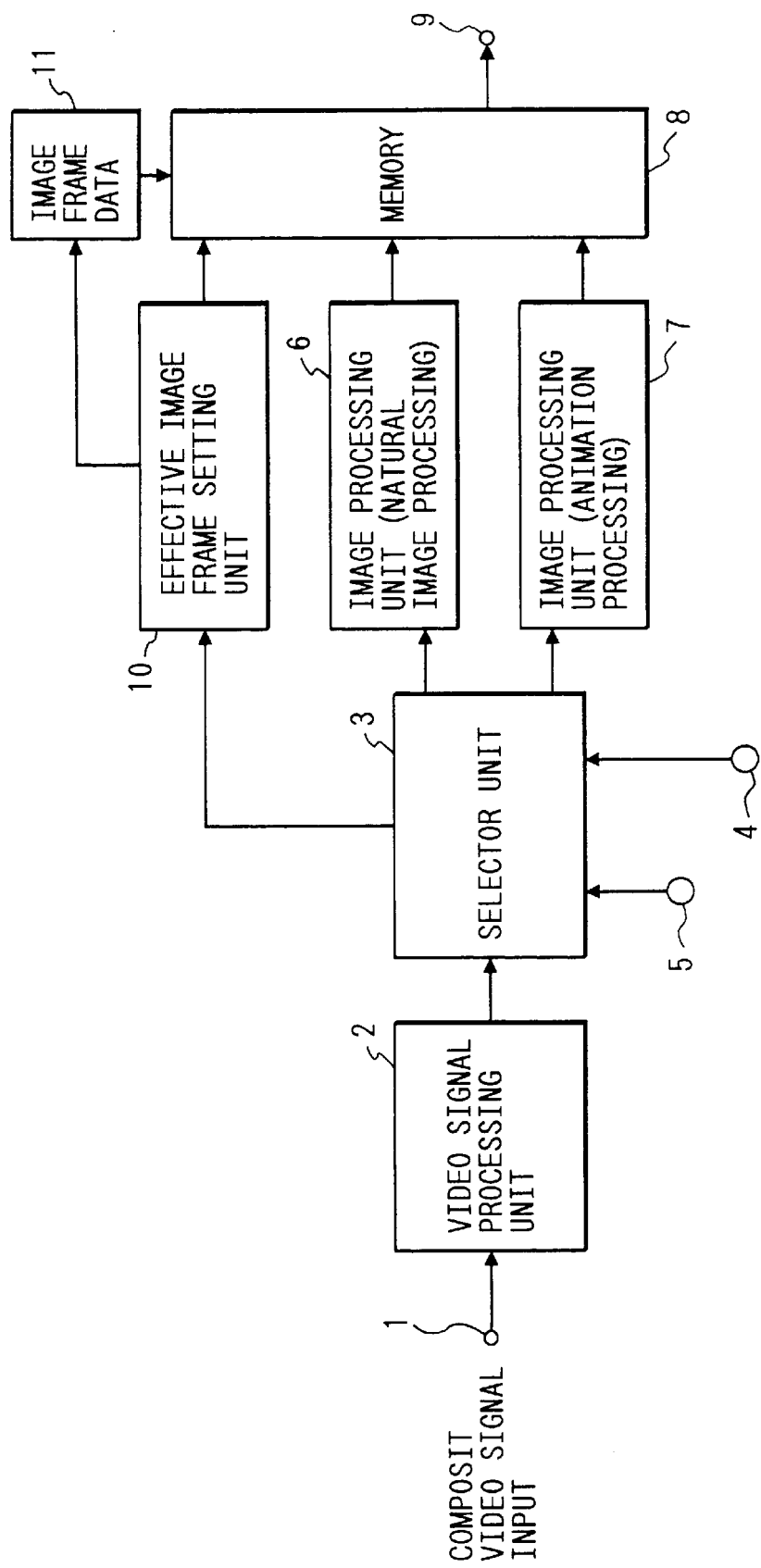
FIG. 5 is a block diagram of a second embodiment of the present invention.

FIG. 5 illustrates a second embodiment of the present invention, wherein components substantially equivalent to those in FIG. 3 are represented by corresponding numbers and will not be further described.

Referring to FIG. 5, there are provided, an effective image frame setting unit 10 for setting an effective image frame size on the image fetched from the selector unit 3; and an image frame data unit 11 for generating image frame data according to the thus set effective image frame size, thereby designating the read-out frame (read-out area) of the memory 8 and replacing the image data outside the frame with predetermined data.

Figure 4:
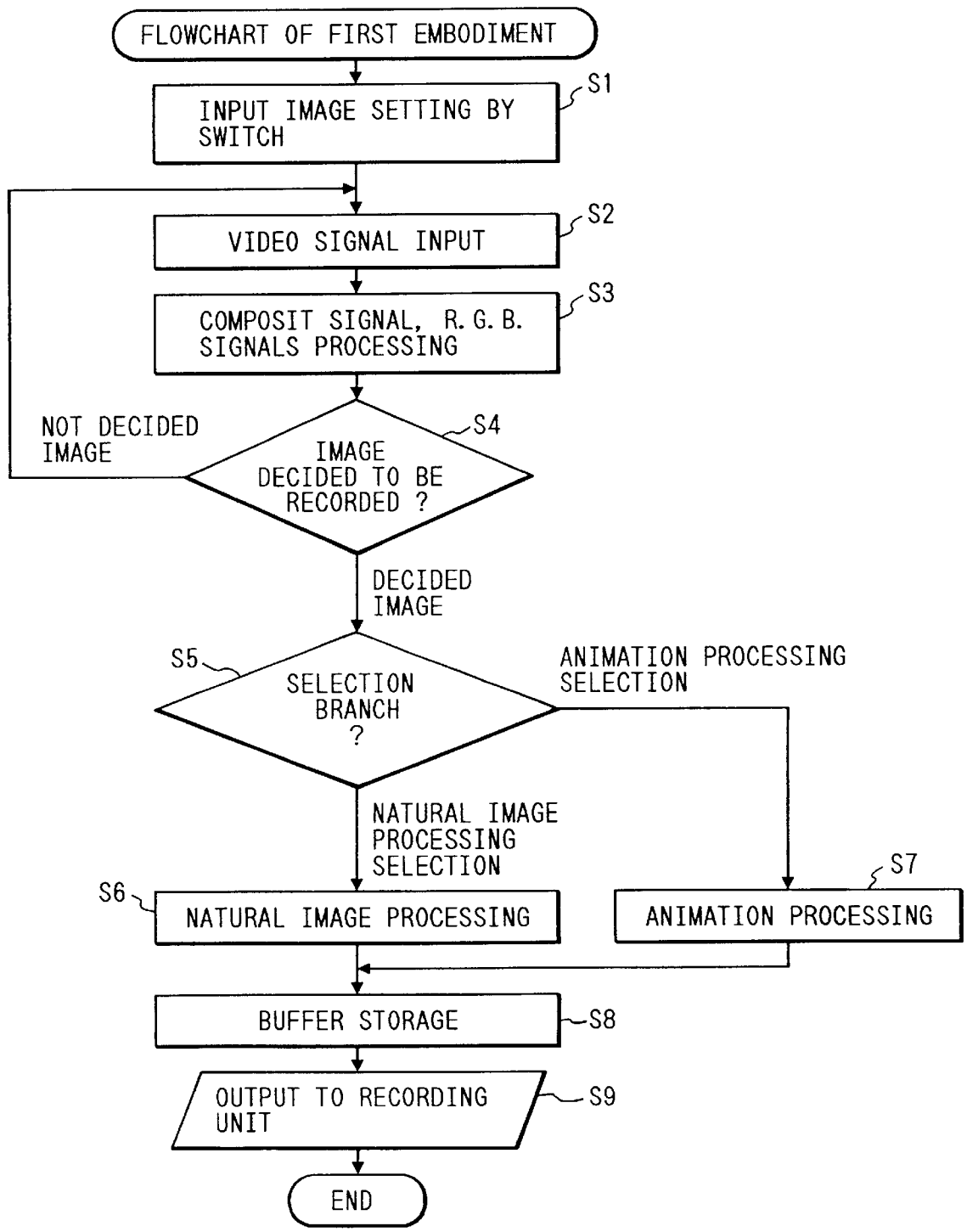
FIG. 4 is a flow chart showing the control sequence of the first embodiment.
Figure 6:
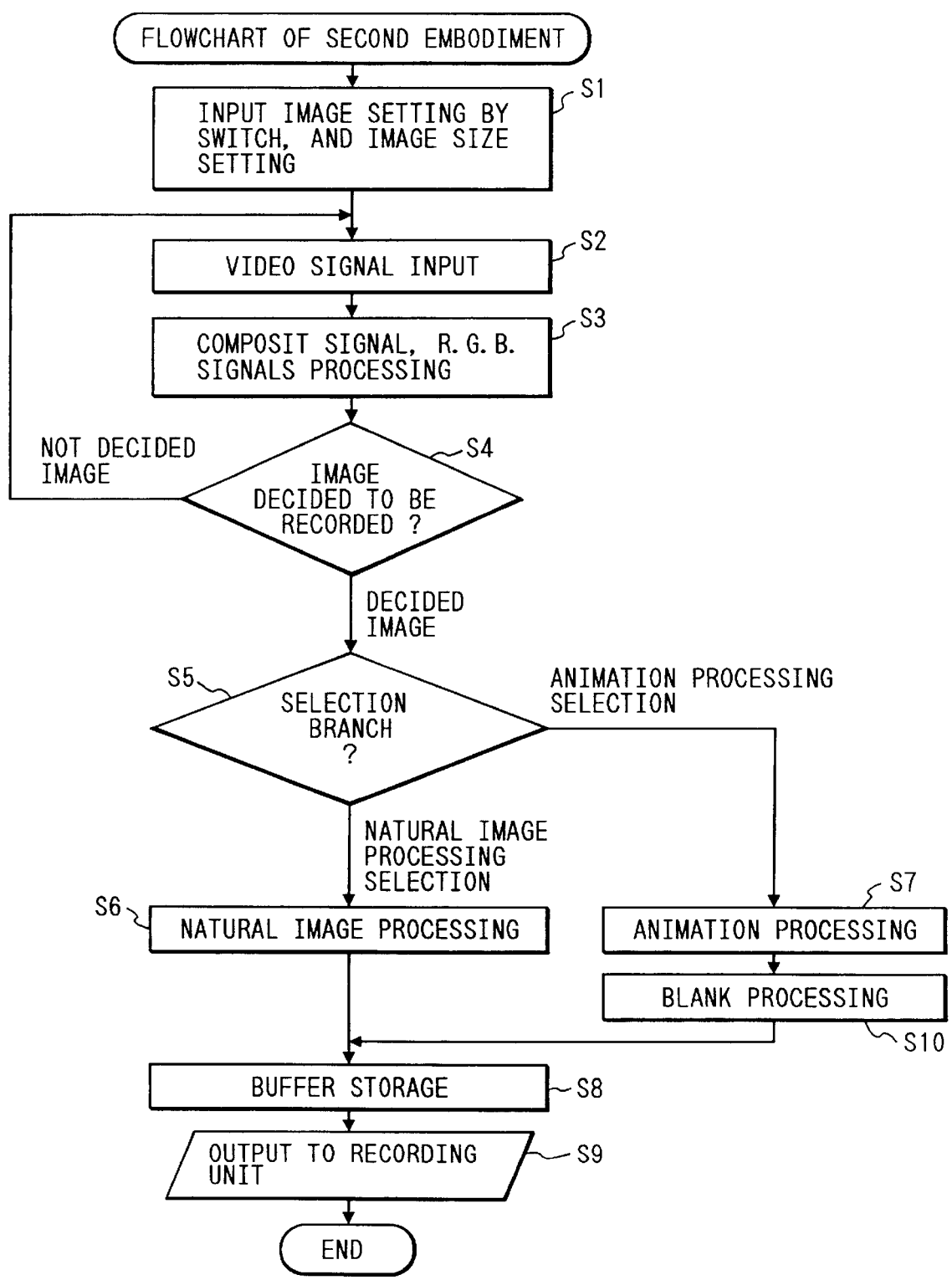
FIG. 6 is a flow chart showing the control sequence of the second embodiment.

FIG. 6 is a flow chart showing the control sequence of the above-described configuration, wherein the steps S1 to S9 correspond to those in FIG. 4. However, the step S1 executes the setting of the input image and of the image frame size. Also, there is added a blanking process by a step S10.

The second embodiment assumes the use of a computer game machine as the video equipment for image input.

At first, the step S1 effects the setting of the image processing mode and the effective image frame size, by the switching apparatus 4. The subsequent process from the step S2 to S7 is conducted in the same manner as in FIG. 4, wherein the step S7 executes the animation image processing. Then a next step S10 executes a blanking process, wherein the effective image frame setting unit 10 provides, based on the set image frame size, data indicating the image frame size to the image frame data unit 11, which in response designates the read-out frame of the memory 8 and replaces the image data outside the same image frame (blank data) with predetermined data for improving the acceptability of the image, for example, by a color or by a pattern.

The animation image processing by the image processing unit 7 is designed to be applicable to the output of the computer game machine, based on computer graphic images. As described in the foregoing, in such a game machine or the like, in which digital graphic data are developed in a memory and converted into analog video signals for transmission, the effective image frame size of the output video signal is determined by the memory capacity provided in such machine. In such game machines, the effective image frame size is limited for the purpose of reducing memory capacity. The blank area generated by such limitation in the effective image frame size is not conspicuous on the cathode ray tube of a television because of the structure thereof, but, in case of printing of the image data of the same amount, such black area is recognized and printed as black data, thus becoming very conspicuous and significantly deteriorating the aesthetic acceptability of the image. In this second embodiment, therefore, there is provided means for replacing the blank data with data of a color or a pattern more acceptable for viewing, in case the animation image process mode is selected, in consideration of the effective output image frame size of the printer or the like used in the mode, thereby improving the aesthetic acceptability of the printed image.

In the present embodiment, the image frame size is selected in a step S1, by the selector unit 3, switch apparatus 4, switch 5 and effective image frame setting unit 10. The image frame size may be fixed, or may be detected by detecting the blank level present in succession, utilizing the image frame end information. In the latter case, the image frame size has to be stably constant in the horizontal and vertical directions. The step S10 also effects a process of uniformly forming the four corners of the blank area. The image data developed by the process of steps S6 and S7 are temporarily stored in the memory 8 (step S8), and then are provided to the recording unit of the printer (step S9).

As described in the foregoing, the first embodiment, being so constructed as to select one of the plural image processing units for effecting mutually different image processings, provides an advantage of always providing a recording apparatus such as printer with image data of optimum quality, by selecting one of the plural image processing units according to the image content.

The second embodiment, being so constructed as to select either of a first image processing unit providing emphasis to image gradation and a second image processing unit providing emphasis to the sharpness of the image contours, provides an advantage of constantly supplying a recording apparatus such as a printer with image data of optimum quality, by selecting the first image processing unit for a natural image, and the second image processing unit for an animation image.

The third embodiment, being so constructed as to select one of plural image processing units for effecting mutually different image processings, also to set the effective image frame area and to replace the image data outside the image frame with predetermined data, provides an advantage of constantly supplying the recording apparatus, such as printer, with image data of optimum quality by selecting one of the image processing units according to the image content, and of eliminating unattractiveness and improving the aesthetic acceptability of the output image by replacing the black blank portion with a predetermined color or pattern even when the image frame size is limited.

The fourth embodiment, being so constructed as to select either of a first image processing unit giving emphasis on the image gradation and a second image processing unit providing emphasis on the sharpness of the image contours, also to set the effective image frame area and to replace the image data outside the image frame with predetermined data, provides an advantage of constantly supplying the recording apparatus such as a printer with image data of optimum quality by selecting the first image processing unit for a natural image and the second image processing unit for an animation image, and of eliminating unattractiveness and improving the aesthetic acceptability of the output image by replacing the black blank portion with a predetermined color or pattern even when the image frame size is limited.

In the following there is explained another embodiment of the present invention.

Figure 7:
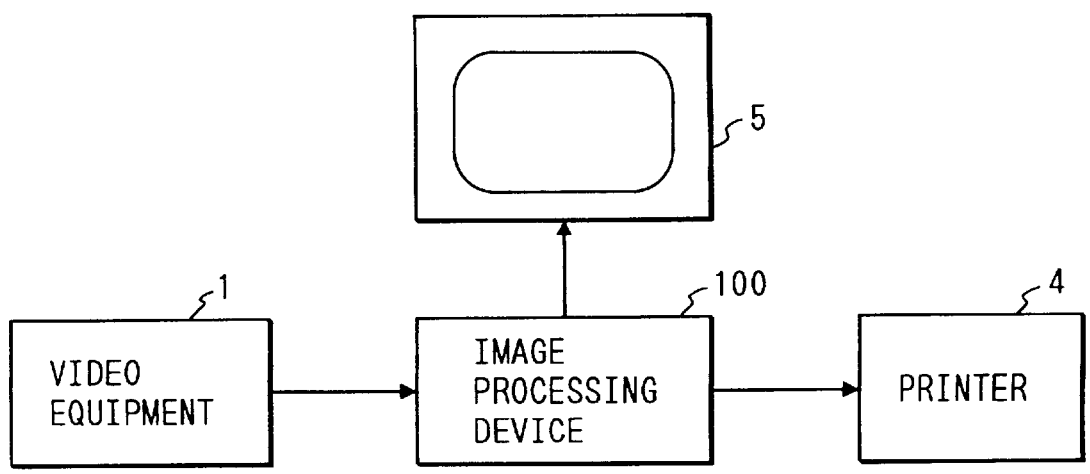
FIG. 7 is a block diagram of another embodiment of the present invention.

FIG. 7 is a block diagram showing the configuration of a printing system employing the image processing apparatus 100 of the present invention.

As shown in FIG. 7, an image signal from a video equipment 1 is received and processed by an image processing apparatus 100 to generate a signal suitable for color printing, monochromatic printing or black-and-white printing. This output signal is provided to a printer 4 for printing on a recording sheet, and is also displayed on a display unit 5. In such case, the printer 4 need not be equipped with the above-described video signal processing circuit.

In the following there is described, with reference to FIG. 8, an embodiment of the image processing apparatus 100 of the present invention.

In FIG. 8, there are shown, a video input terminal 10; a demodulation/color separation unit 11 for demodulating the video signal and separating the video signal into three primary color signals; memories 12, 13, 14 for respectively storing the image information of a frame or a field, of three primary colors, i.e. red (R), green (G) and blue (B), of the video signal; coefficient multiplying units 15, 16, 17 for multiplying the three primary color signals, read from the memories 12, 13, 14, respectively, with coefficients α, β and γ; an adder 18 for adding the three primary color signals subjected to the multiplication with the coefficients α, β and γ; and an image processing unit 19 for processing the output of the adder 18 to obtain luminance information 20.

An image processing unit 21 processes the above-mentioned three primary color signals R, G, B, read from the memories 12, 13, 14, to generate color ink density information 22, 23, 24, 25, respectively, of cyan, yellow, magenta and black colors. A memory 26, for storing the ink density information 22–25, stores the ink density information corresponding to the image information of plural scanning lines in case of a color print mode to be described later, and stores the information of an image frame for one color of the ink in case of a monochromatic print mode. There is also shown density information 27 of the color inks read from the memory 26.

Figure 2:
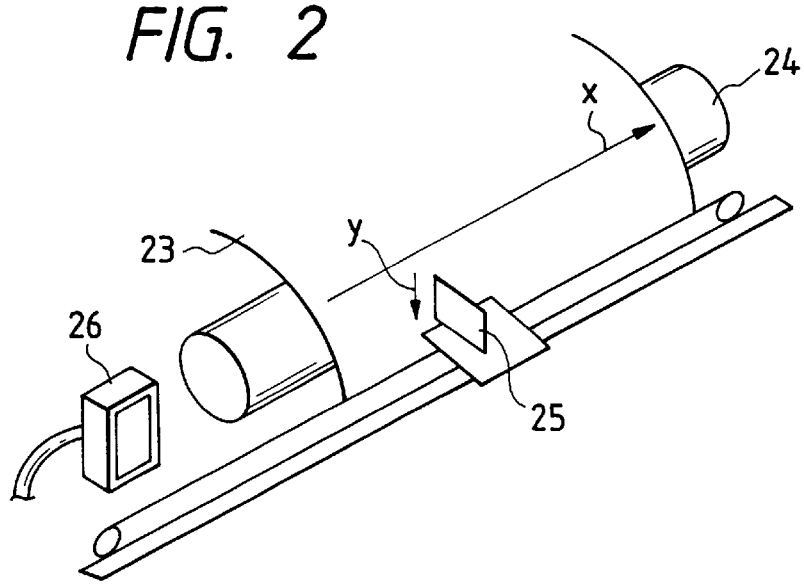
FIG. 2 is a perspective view of a recording unit of a printer with an ink jet recording system.

There are also provided, a switch 28 for switching the density information 27 and the luminance information 20; an output terminal 29 for transmitting the density information 27 or the luminance information 20, switched by the switch 29, for provision to the printer shown in FIG. 2, and a control unit 30 for controlling the switch 28, image processing units 19, 20, memory 26 etc. and selecting the print modes.

The function of the above-described circuit is described below.

The video signal provided from the input terminal 10 is demodulated and separated into the three primary color signals R, G, B in the demodulation/color separation unit 20, and respective information of a frame (or a field) are stored in the memories 12, 13, 14. Thus accumulated image information of the three primary colors are processed corresponding to (1) color print mode, (2) monochromatic print mode, or (3) black-and-white print mode.

In case of the above-mentioned color print mode, the image information represented by the three primary color signals R, G, B are processed in the image processing unit 21, which processes in succession a part of the scanning lines of the entire image frame so as to provide an optimum image in the printing operation with a color printer, thereby effecting conversion to the density information 22–25 of the color inks, namely the inks of cyan, yellow, magenta and black colors, employed in the color printer, and the information are is stored in the memory 26. The stored ink density information 22–25 are read in succession, corresponding to each scanning line, and transmitted as the density information 27. The process executed by the image processing unit 21 includes conversion of resolution, correction of gradation, improvement in sharpness, and reproduction of colors and noise suppression.

Also in case of the monochromatic mode, the image information of the three primary colors R, G, B stored in the memories 12–14 are processed in the image processing unit so as to provide an optimum image in the printing operation with a monochromatic printer, thereby effecting conversion to the density information 22–25 of the inks of cyan, yellow, magenta and black colors and the information is stored for each ink, in the memory 26. Then the operation of releasing the density information 27 is repeated for each color.

In case of the black-and-white mode, the three primary color signals R, G, B stored in the memories 12–14 are respectively multiplied by the coefficients α, β, γ so as to reach a ratio of approximately 0.3:0.6:0.1 and are mixed in the adder 18 to generate luminance information corresponding to the relative sensitivity curve of the human eye. The luminance information is then processed in the image processing unit 19 so as to provide an optimum image in the printing operation with a black-and-white printer, and is provided as the luminance information 20 for black-and-white printing.

The ink density information 27 or the luminance information obtained by the foregoing image processing corresponding to the printer is switched in the switching unit 28 according to the printing mode and supplied to the connected printer.

In the foregoing description, the printer has not been particularly explained, but the present invention is applicable to, for example, a dye sublimation printer, a thermal fusion printer or an ink jet printer.

As explained in the foregoing, the above-described embodiment generates three primary color signals from the input video signal, then processes the three primary color signals to generate density information of color inks and luminance information suitable for color printing, monochromatic printing or black-and-white printing and selectively provides the information. Thus, there, are provided advantages of supplying the connected printer with image information matching the print mode thereof, printing a color image with a color printer or a monochromatic printer not provided with the video signal processing circuit, and printing a black-and-white video image with a black-and-white printer.

What is claimed is:

1. A color image processing apparatus comprising:
   input means for inputting image data representing motion video;
   setting means for setting color processing method to be performed on the input image data, the color processing method including a first color processing method appropriate to an animation image and a second color processing method different from said first color processing method and which is appropriate to a natural image; and
   color processing means for performing a color processing based upon the color processing method set be said setting means,
   wherein when said first color processing method is set, said color processing means discriminates an effective picture size of the input motion video and assigns a predetermined image data to an outer area of the effective picture size while said color processing means performs a color correction process appropriate to the animation image.

2. An apparatus according to claim 1, wherein said setting means selects said first color processing method or said second color processing method based upon an instruction by a user.

3. An apparatus according to claim 1, wherein said image data is a composite video signal.

4. An apparatus according to claim 1, wherein said first color processing method is one in which importance is attached to clearness of an outline of an image, and said second color processing method is one in which importance is attached to gradation of the image.

5. An apparatus according to claim 1, further comprising:
   discrimination means for discriminating effective picture size based upon the input image data; and
   means for assigning predetermined image data to an outer area of the effective picture size.

6. A video printer comprising:
   input means for inputting an image;
   means for capturing a predetermined still image from the input image;
   setting means for setting color processing method according to a kind of the predetermined still image, the color processing method including a first color processing method appropriate to an animation image and a second color processing method different from said first color processing method and which is appropriate to a natural image;
   color processing means for performing a color processing based upon the color processing method set by said setting means; and
   image forming means for forming an output image based upon image data on which the color procesing is preformed,
   wherein when said first color processing method is set, said color processing means discriminates an effective picture size of the input motion video and assigns a predetermined image data to an outer area of the effective picture size while said color processing means performs a color correction process appropriate to the animation image.

7. A video printer according to claim 6, wherein said first color processing method is one in which importance is attached to clearness of an outline of an image, and said second color processing method is one in which importance is attached to gradation of the image.

8. A video printer according to claim 6, further comprising:
   discrimination means for discriminating effective picture size based upon the input image; and
   means for assigning predetermined image data to an outer area of the effective picture size.

9. A color image processing method comprising the steps of:
   inputting image data representing motion video;
   setting a color processing method to be performed on the input image data, the color processing method including a first color processing method appropriate to an animation image and a second color processing method different from said first color processing method and which is appropriate to a natural image; and
   performing a color processing based upon the color processing method set by said setting step,
   wherein when said first color processing method is set, said color processing means discriminates an effective picture size of the input motion video and assigns a predetermined image data to an outer area of the effective picture size while said color processing means performs a color correction process appropriate to the animation image.

10. A method according to claim 9, further comprising a step of capturing a predetermined still image from the motion video.

11. A method according to claim 9, wherein the animation image includes an image output from a game machine.

12. An image processing apparatus comprising:
    color separation means for separating an input video signal into predetermined color signals;
    first image processing means for processing said color signals obtained from said color separation means to generate density information for plural color inks suitable for color printing, monochromatic printing of black-and-white printing;
    a memory for storing said density information obtained from said first image processing means, and effecting read-out of said density information in the unit of plural scanning lines in case of color printing, and in the unit of an image frame in case of monochromatic printing;
    second image processing means for mixing said color signals obtained from said color separation means with a predetermined ratio and applying a signal processing suitable for black-and-white printing, thereby generating luminance information;
    switch means for selecting either said density information read from said memory or said luminance information obtained from said second image processing means; and
    control means for controlling said first and second image processing means, memory and switch means.

* * * * *

UNITED STATES PATENT AND TRADEMARK OFFICE
CERTIFICATE OF CORRECTION

PATENT NO. : 6,115,148
DATED : September 5, 2000
INVENTOR(S) : Kunio Imai et al.

It is certified that error appears in the above-identified patent and that said Letters Patent is hereby corrected as shown below:

ON COVER PAGE

Insert: --[30] Foreign Application Priority Data

June 2, 1994 [JP] Japan .... 6-120959
    June 2, 1994 [JP] Japan .... 6-120960

Insert: --[64] Related U.S. Application Data

[63]   Continuation of application No. 08/455,085, May 31, 1995, abandoned

Sheet 3
FIG. 3, "COMPOSIT" should read --COMPOSITE--.

Sheet 4
FIG. 4, "COMPOSIT" should read --COMPOSITE--.

Sheet 5
FIG. 5, "COMPOSIT" should read --COMPOSITE--.

Sheet 6
FIG. 6, "COMPOSIT" should read --COMPOSITE--.

UNITED STATES PATENT AND TRADEMARK OFFICE
CERTIFICATE OF CORRECTION

PATENT NO.   : 6,115,148
DATED        : September 5, 2000
INVENTOR(S)  : Kunio Imai et al.

It is certified that error appears in the above-identified patent and that said Letters Patent is hereby corrected as shown below:

Column 1
Line 26, "according a" should read --according to a--;
Line 35, "circuit" should read --circuit)--;
Line 52, "is-executed" should read --is executed--;
Line 54, "sub scanning" should read --sub scanning--.

Ccolumn 2
Line 5, "executes same" should read --executes the same--;
Line 10, "luminocity" should read --luminosity--;
Line 12, "an" should be deleted;
Line 13, "disadvantages" should read --disadvantageous--.

Column 4
Line 41, "flow chart" should read --flowchart--;
Line 46, "flow chart" should read --flowchart--;
Line 58, "as;" should read --as--.

Column 5
Line 17, "flow chart" should read --flowchart--.

UNITED STATES PATENT AND TRADEMARK OFFICE
CERTIFICATE OF CORRECTION

PATENT NO. : 6,115,148
DATED : September 5, 2000
INVENTOR(S) : Kunio Imai et al.

It is certified that error appears in the above-identified patent and that said Letters Patent is hereby corrected as shown below:

Column 6
Line 6, "flow chart" should read --flowchart--.

Column 7
Line 18, "printer," should read --a printer,--;
Line 24, "giving" should read providing--.

Column 8
Line 22, "are" should read --is--;
Line 24, "are" should read --is--;
Line 28, "are" should read --is--;
Line 35, "are" should be deleted;
Line 36, "are" should read --is--;
Line 44, "are" should read --is--.

UNITED STATES PATENT AND TRADEMARK OFFICE
CERTIFICATE OF CORRECTION

PATENT NO. : 6,115,148
DATED : September 5, 2000
INVENTOR(S) : Kunio Imai et al.

It is certified that error appears in the above-identified patent and that said Letters Patent is hereby corrected as shown below:

Column 9
Line 18, "setting" should read --setting a--;
Line 26, "be" should read --by--;
Line 66, "procesing" should read --processing--;
Line 67, "preformed," should read --performed,--.

Column 10
Line 48, "of" should read --or--.

Signed and Sealed this

Twelfth Day of June, 2001

*Attest:*

NICHOLAS P. GODICI
*Attesting Officer*     *Acting Director of the United States Patent and Trademark Office*